United States Patent
Zanker et al.

[15] 3,668,931
[45] June 13, 1972

[54] MEASURING THE VELOCITY OF FLOW OF AN ELECTRICALLY CONDUCTIVE FLUID

[72] Inventors: Klaus Joachim Zanker, Streatley; Derrick Norman Harrison, Gloucester, both of England

[73] Assignee: Kent Instruments Limited, Luton, Bedfordshire, England

[22] Filed: July 20, 1970

[21] Appl. No.: 56,605

[30] Foreign Application Priority Data

July 24, 1969 Great Britain..................37,358/69

[52] U.S. Cl..........................................73/181, 73/194 EM
[51] Int. Cl............................................G01c 21/10
[58] Field of Search.....................................73/181, 194 EM

[56] References Cited

UNITED STATES PATENTS 3,308,659 3/1967 Herndon..........................73/194 EM
2,969,673 1/1961 Snyder et al......................73/181 X Primary Examiner—Donald O. Woodiel
Attorney—Young & Thompson

[57] ABSTRACT

An electromagnetic velocity meter is described, of the type in which an electric signal is generated in response to relative motion between the velocity meter and a conductive fluid in a magnetic field generated by means in the velocity meter, to provide a measure of the velocity of the relative motion. The velocity meter is particularly useful as a ship's log, and may be arranged to be retractably mounted in a ship's hull. A preferred form of the velocity meter is circular in cross section and has a pair of electrodes for sensing the electric signal, the electrodes being disposed on the flow meter in a manner tending to minimize misalignment error. It also has boundary layer trips to make the signal generated/velocity characteristic more nearly linear. Another preferred form mounts three or more electrodes for measuring components of the flow velocity in different directions, whereby the drift angle and velocity of the ship may be computed.

13 Claims, 10 Drawing Figures

PATENTED JUN 13 1972 3,668,931

INVENTORS
KLAUS JOACHIM ZANKER
DERRICK NORMAN HARRISON
BY Young + Thompson
ATTYS.

MEASURING THE VELOCITY OF FLOW OF AN ELECTRICALLY CONDUCTIVE FLUID

This invention relates to a velocity meter for providing an electric signal dependent on the speed of movement thereof relative to an electrically conductive fluid, and more specifically to an electromagnetic ship's log.

Hitherto, it has been usual for an electromagnetic ship's log to have a generally streamlined shape e.g., having an oval or elliptical cross-section, so that disturbance of the surrounding liquid and drag forces on the log are minimised. A log of this general type is described in US Pat. No. 2,969,673.

Such a streamlined log has a number of disadvantages.

Manufacture is necessarily more expensive and more complex than the manufacture of a log having a relatively simple shape. Further, some streamlined shapes may be subject to hydrodynamic lift which, particularly at high speeds, gives rise to a high stress loading on the means for mounting the log. Streamlined logs are also subject to cavitation on directional change which produces a temporarily inaccurate speed reading.

A notable disadvantage with many logs of the streamlined type is that due to their streamlined shape they are rather sensitive to misalignment, and thus, as evidenced by the above-mentioned US Patent, they require means to align them precisely with the fluid flow, which means may be fairly elaborate.

It is the object of the present invention to provide an improved electromagnetic velocity meter which will overcome or alleviate at least some of the disadvantages of the prior art devices.

The present invention, according to one aspect thereof, provides a velocity meter for providing an electric signal dependent on the speed of movement thereof relative to an electrically conductive fluid, the velocity meter comprising a housing having a passage therein with at least one open end, a casing movable in the passage between an inoperative position within the housing and an operative position projecting from the open end into the fluid, the casing containing means operable to produce a magnetic field in the fluid in the operative position of the casing, and a pair of electrodes carried on the casing for contact with the fluid in the operative position to sense the electric potential difference due to the relative movement to provide the signal, the casing and the housing co-operating to prevent ingress of the fluid through the passage.

The electrodes are preferably carried on a portion of the casing which is substantially circular, and at least one further electrode may be provided on said portion of the casing, the electrodes then being equally spaced around the periphery of said portion to provide a plurality of electric signals dependent on components of the speed of relative movement in different directions. Such an arrangement preferably has two pairs of electrodes disposed at the ends of two perpendicular diameters of said portion of the casing. Each electrode will, of course, be electrically insulated from the casing, should the casing be electrically conductive.

The invention, according to a second aspect thereof, provides a velocity meter for providing an electric signal dependent on the speed of movement thereof to an electrically conductive fluid, the velocity meter comprising a casing, means in the casing for producing a magnetic field in the fluid, and a pair of electrodes carried on a portion of the casing of substantially circular cross-section for contact with the fluid to sense the electric potential difference between the electrodes due to such relative movement to provide the signal, one electrode being disposed on each of the two leading quadrants of said portion.

As is described in more detail below, the fact that one electrode is located on each of the leading quadrants gives rise to the advantage that if the casing is misaligned, the potential on one electrode rises and that on the other falls, the net effect tending to cancel out the error in the potential difference induced between the electrodes caused by the misalignment.

Further, a cylindrical casing is much less sensitive to misalignment than a streamlined casing would be, as misalignment of a cylindrical casing produces a much smaller change in the flow pattern than misalignment of a streamlined shape.

The casing preferably has at least one boundary layer trip on its surface for decreasing the transition fluid velocity at which the flow in the boundary layer of the casing changes from laminar to turbulent. As is explained in detail later, the trip or trips make the potential difference/speed characteristic of the velocity meter more nearly linear. Preferably, a pair of boundary layer trips is provided, each trip being parallel to the axis of the casing and one trip being located on each of the two leading quadrants of the casing. The trips may comprise slots in the surface of the casing, straight wires laid along the surface, or roughened areas on the surface. In a preferred arrangement, each trip subtends an angle of substantially 80° to the radius of the casing passing through the front stagnation point thereof.

The invention will be better understood from the following description, given by way of example only, of illustrative embodiments thereof, having reference to the accompanying drawings, in which.

Figure 1:
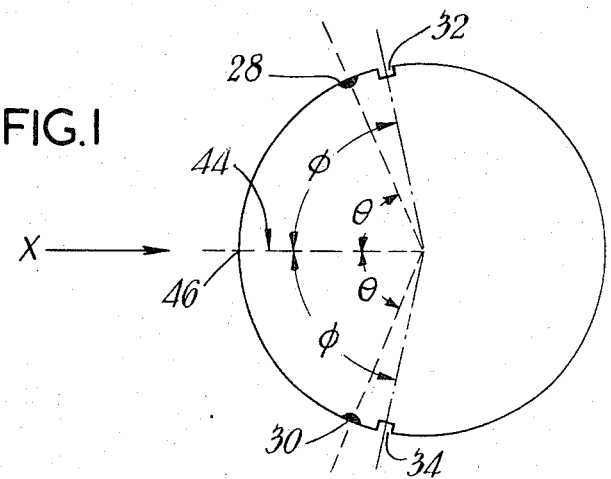
FIG. 1 is a side view of a first electromagnetic ship's log embodying the invention.
Figure 2:
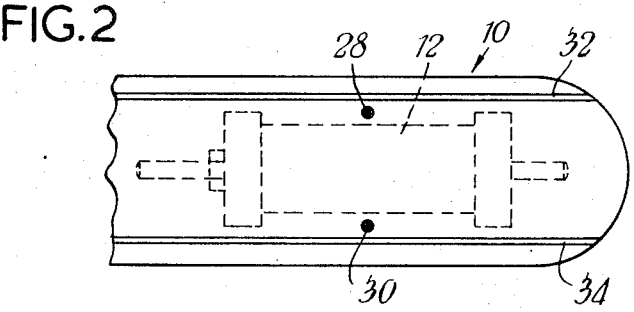
FIG. 2 is a partial front view of the log shown in FIG. 1, viewed in the direction of the arrow X, and drawn to a reduced scale.

With reference to FIGS. 1 and 2, a ship's log having a circular cylindrical casing shown generally at 10 is carried by a ship, as is described in more detail below, such that water is caused to flow around the casing, at right angles to its axis, as shown by the arrow X in FIG. 1.

The log is provided with a coil assembly 12, for generating a magnetic field having a component at right angles to the general direction of flow, when energised by a current supplied from the ship.

Figure 3:
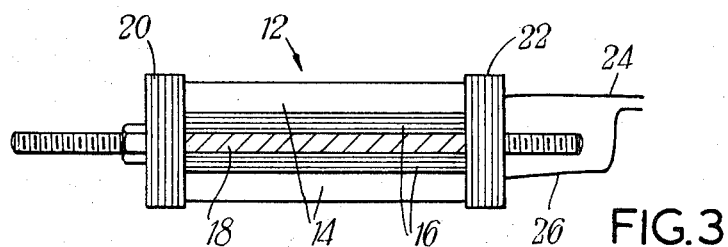
FIG. 3 is a sectional view of the coil assembly used to generate a magnetic field in the log shown in FIGS. 1 and 2.

The coil assembly 12 is shown in more detail and in axial section in FIG. 3. A coil 14, consisting of approximately 1,000 turns of 22 SWG copper wire, is wound on a core formed from 0.020 inch thick silicon iron laminations 16 rolled on to a former 18. Two pole pieces 20 and 22 are each formed from a stack of 0.020 inch thick silicon iron lamination discs bonded together by an epoxy resin, the pole piece 22 having a pair of holes therein (not shown) for egress of connections 24, 26 to the coil 14. It will be evident that the thicknesses of the laminations 16 and the laminations forming the pole pieces 20 and 22 are greatly exaggerated in FIG. 3 for clarity of illustration.

When the velocity meter is in operation, the coil 14 is energised by a power supply inside the ship via the wires 24, 26, to generate the required magnetic field.

A pair of electrodes 28, 30 are arranged one on each of the two leading quadrants of the surface of the casing 10 so that motion of the log through sea water which is, of course, a conductive fluid, in the presence of the magnetic field generated by the coil assembly 12, induces a potential difference between the electrodes which causes a current I to flow therebetween, the current being proportional to the velocity of flow of the fluid, as is explained below. Further means (not shown) are provided so that this current can be monitored in the ship to provide an indication of the speed of the ship through the water.

The behaviour of fluid flowing over the surface of a circular cylinder, the general direction of the flow being substantially perpendicular to the axis of the cylinder, is known, and an expression has been derived for the drag force F exerted on the cylinder by such a flow. This expression is:

$$F = \frac{C_D \cdot \rho \cdot A \cdot V^2}{2}$$

where $\rho$ = the density of the fluid;
$A$ = the area of the cylinder projected onto a plane normal to the direction of flow;
$V$ = the free-stream velocity of the fluid; and
$C_D$ = a non-dimensional quantity referred to as the "drag coefficient."

Figure 4:
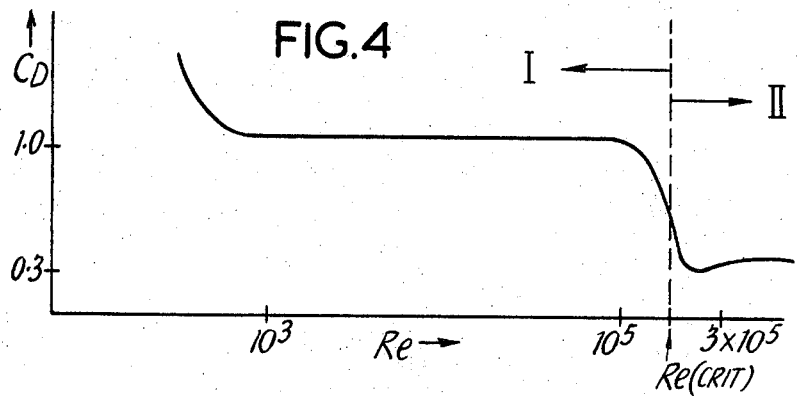
FIG. 4 is a graph showing the variation of the drag coefficient $C_D$ with the Reynold's number $R_e$ for flow of a fluid round a circular cylindrical body, the flow being substantially perpendicular to the axis of the cylinder.

FIG. 4 illustrates a typical example of the way the drag coefficient $C_D$ varies with the Reynold's number $R_e$ of the flow.

The Reynold's number $R_e$ is given by the expression:

$$R_e = \frac{V \cdot d \cdot \rho}{\mu}$$

where $\mu$ = the viscosity of the fluid, and
$d$ = the diameter of the cylinder.

Thus, $d$ being constant, and $\mu$ and $\rho$ being substantially so, FIG. 4 is equivalent in shape to a plot of $C_D$ against V. It can thus be seen that $C_D$ is approximately constant over a range of velocities, (I), up to a Reynold's number of about $10^5$, and suffers an abrupt drop when the Reynold's number, and hence the velocity, exceeds (II) a certain critical value $R_e$ (CRIT), due to the nature of the flow in the boundary layer around the log changing from laminar to turbulent.

Figure 5:
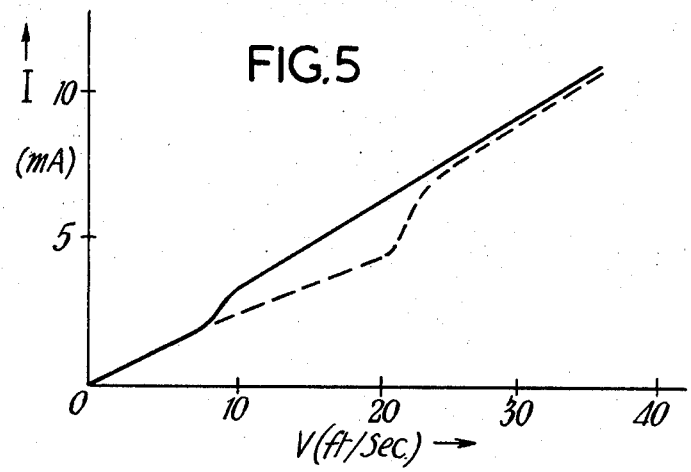
FIG. 5 is a graph showing the variation of the current flowing as a result of the potential difference induced between the electrodes of the log shown in FIG. 1 with the relative speed between the log and the water.

Due to the discontinuity in the $C_D/R_e$ curve referred to above, there is a corresponding discontinuity in the curve of current I plotted against free stream velocity V. FIG. 5 (the dotted line) illustrates the effect of the discontinuity on a log having a 2-inch diameter casing.

In FIG. 5, the dotted line represents the curve which would be obtained if the surface of the casing were uninterrupted. However, the surface is provided with two axial slots 32, 34 which may, for example, be square in cross-section. These slots act as boundary layer trips, causing the flow in the boundary layer to change from laminar to turbulent at a lower velocity (approximately 10ft/sec in this case) than it would do if the surface were uninterrupted. Thus, the discontinuity is reduced in magnitude and caused to occur at a substantially reduced speed, giving a more nearly linear current/speed characteristic, as shown by the full line in FIG. 5.

Provision of these boundary layer trips gives rise to two further advantages. The drag force F on the log is reduced in magnitude, thus reducing the risk of the log breaking. It has also been found that less vibration is produced.

For optimum effect, the cross-sectional dimensions of the slot are preferably of the same order as the boundary layer thickness.

Figure 8:
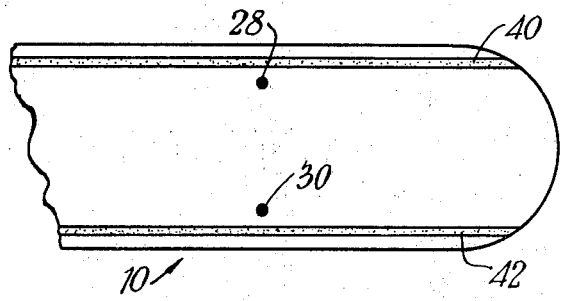
FIG. 8 is a view corresponding to FIG. 2 of a third embodiment.
Figure 7:
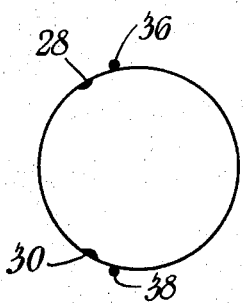
FIG. 7 is a view corresponding to FIG. 1 of a second embodiment of the invention.

The boundary layer trip can be provided by different means than by the slots 32, 34. A pair of straight axially extending wires 36, 38 may be employed instead, as shown in FIG. 7, or even elongate roughened strips 40, 42 on the surface of the casing, as shown in FIG. 8.

The angle $\phi$ which the trips subtend to the radius 44 of the casing passing through the front stagnation point 46 and hence to the direction of flow is important. In this particular embodiment $\phi$ was chosen to be 80°. Although satisfactory results can be obtained with $\phi$ less than 80°, it is preferred not to use an angle greater than 80°.

Figure 6:
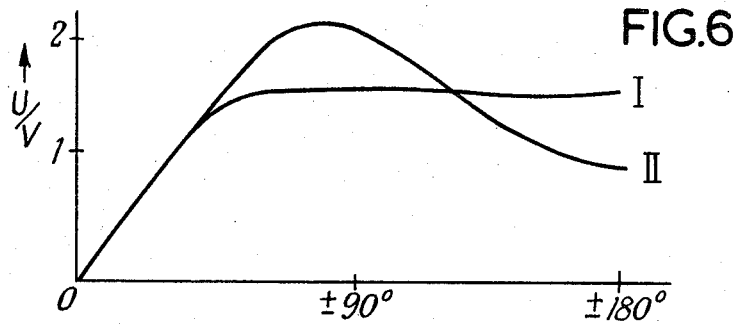
FIG. 6 is a graph showing the variation of the ratio of the local fluid velocity U, round the periphery of the log illustrated in FIGS. 1 and 2, to the free stream velocity V.

FIG. 6 shows the variation in the ratio of the local fluid velocity U on the periphery of the cylinder shown in FIG. 1, to the fluid free stream velocity V, for sub-critical $R_e$ flow (I) and for super-critical $R_e$ flow, (II). For super-critical Re flow the ratio ranges from zero at the front stagnation point 46 to maxima at +90° and −90° round the periphery i.e., both over and under the casing.

It can be seen from FIG. 6 that for super-critical $R_e$ flow, with the electrodes 28, 30 positioned so that the angle $\theta$ which each subtends to the radius 44 is 90°, misalignment of the log, i.e., angular displacement of the radius 44 from the direction of the fluid flow X, would reduce the potential on both electrodes, since the local fluid velocity would be reduced in both cases.

The electrodes are thus advantageously placed so as to subtend an angle of substantially less than 90° to the radius 44, for example 75°, so that misalignment will cause the potential on one electrode to increase and that on the other to decrease, thus providing at least partial compensation for the misalignment.

It is in any case desirable that $\theta$ is less than 90° i.e., that the electrodes are kept on the two leading quadrants of the casing, to avoid the effects of cavitation and of the disturbed flow pattern at the rear of the casing.

Apart from this, the angular positioning of the electrodes is not critical, but it is of course desirable that they should be spaced sufficiently far apart to generate a current of an amplitude which is conveniently measurable.

It will be appreciated that the current generated is proportional to the integrated effect of the product, at every point in the fluid, of the magnetic field and the flow field. Because of the distance factor, in practice only fluid close to the log, i.e., within a distance of the order of the radius of the log from either electrode, contributes to the signal. Thus, provided the flow pattern remains constant with velocity, the current will be substantially directly proportional to the free stream velocity V of the water, i.e., to the speed of the ship through the water.

Figure 9:
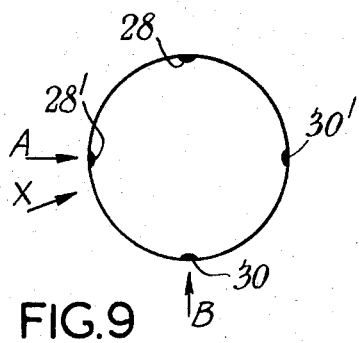
FIG. 9 is a view corresponding to FIG. 1 of a fourth embodiment.

A further embodiment of the invention is illustrated in FIG. 9. In this embodiment, a further pair of electrodes 28', 30' is provided, so that, if X represents the direction of flow, two perpendicular components of the flow, in the direction A and B, are measured. Thus, if the log is positioned so that the direction A is the fore-and-aft direction of the ship, then the potential difference developed between the electrodes 28 and 30 is indicative of the velocity made good along the ships heading, and that developed between the electrodes 28' and 30' is indicative of the drift velocity of the ship. By comparing these two potential differences, the drift angle can be simply computed.

It can be seen that the embodiment of FIG. 9 does not have each pair of electrodes disposed in the associated leading quadrants whereby partial compensation for misalignment is produced. Thus, in this embodiment, any errors due to misalignment must be allowed for by a calibration process.

It will be evident that other embodiments like that shown in FIG. 9 may be employed for measuring components of the flow velocity in two mutually perpendicular directions. For example, if three electrodes are equispaced around the periphery of the casing, then three potential differences will be produced, two of which can be compared to compute the forward and drift velocities and the drift angle. Likewise, five or more electrodes, desirably equispaced around the periphery of the casing, can be used to provide a number of signals for comparison to compute the desired parameters.

Figure 10:
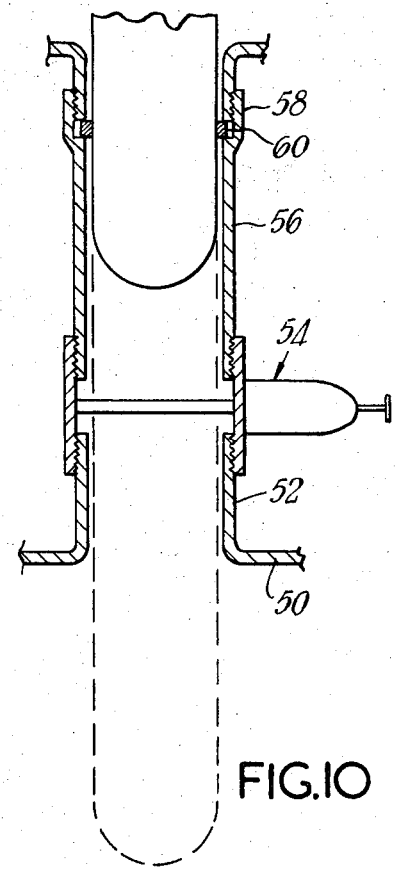
FIG. 10 illustrates the manner in which the log may be retractably mounted in a ship's hull.

FIG. 10 illustrates the manner in which any of the above-described logs embodying the invention may be extended and retracted through an aperture in a ship's hull. The ships hull 50 is provided with an inwardly extending integral cylindrical portion 52 having an external thread on its inboard end. A closure valve 54 is screwed on to the portion 52, and connects said portion to a circular duct or housing 56 which incorporates a gland shown generally at 58. The duct 56 is dimensioned so that the log can slide freely therein, an annular packing ring 60 incorporated in the gland 58 tightly engaging the casing 10 of the log to prevent water flowing into the ship when the valve 54 is open.

The manner in which the log is extended for use from the retracted position shown in full lines in FIG. 10 to the extended position shown in dotted lines is described below. The valve 54 is fully opened to allow water to fill the duct 56 as far as the gland 58, or, if the duct already contains water, to allow the pressure in the duct to equalise with the pressure of the water outside. The log is then slid out to and locked in the dotted line position, ready for use.

Although the invention has been described with reference to a ship's log, with sea water as the conductive fluid, the invention may equally well be used to measure the velocity of flow of any electrically conductive fluid whether unconfined or wholly or partly confined.

Furthermore, although the casing in the embodiments described is circular in cross-section, other bluff casings of a generally cylindrical configuration may alternatively be employed.

We claim:

1. A velocity meter for providing an electric signal dependent on the speed of movement thereof relative to an electrically conductive fluid, the velocity meter comprising a housing having a passage therein with at least one open end, a casing movable in the passage between an inoperative position within the housing and an operative position projecting from the open end into the fluid, the casing containing means operable to produce a magnetic field in the fluid in the operative position of the casing, and a pair of electrodes carried on a portion of the casing of substantially circular cross section for contact with the fluid in the operative position to sense the electric potential difference due to the relative movement to provide the signal, the casing and the housing cooperating to prevent ingress of the fluid through the passage.

2. A velocity meter according to claim 1, wherein at least one further electrode is provided on said portion of the casing, the electrodes being equally spaced around the periphery of said portion to provide a plurality of electric signals dependent on components of the speed of relative movement in different directions.

3. A velocity meter according to claim 2, having two pairs of electrodes disposed at the ends of two perpendicular diameters of said portion of the casing.

4. A velocity meter according to claim 2, wherein one electrode of the pair is disposed on each of the two leading quadrants of said portion.

5. A velocity meter according to claim 4, wherein a boundary layer trip, extending parallel to the axis of the casing, is located on each of said leading quadrants of said portion of the casing.

6. A velocity meter according to claim 5, wherein the radius of said portion of the casing passing through each strip subtends an angle of approximately 80° to the radius of the casing passing through the front stagnation point thereof.

7. A velocity meter for providing an electric signal dependent on the speed of movement thereof relative to an electrically conductive fluid, the velocity meter comprising a casing, means in the casing for producing a magnetic field in the fluid, and a pair of electrodes carried on a portion of the casing of substantially circular cross-section for contact with the fluid to sense the electric potential difference between the electrodes due to such relative movement to provide the signal, one electrode being disposed on each of the two leading quadrants of said portion.

8. A velocity meter according to claim 7, wherein at least one boundary layer trip is provided on the surface of said portion of the casing for decreasing the transition fluid velocity at which the flow in the boundary layer of the casing changes from laminar to turbulent.

9. A velocity meter according to claim 8, wherein a pair of boundary layer trips is provided, each trip being parallel to the axis of the casing and one trip being located on each of the two leading quadrants of the casing.

10. A velocity meter according to claim 9, wherein the radius of the casing passing through each trip subtends an angle of substantially 80° to the radius of the casing passing through the front stagnation point thereof.

11. A velocity meter according to claim 9, wherein each boundary layer trip comprises a slot in the surface of the casing.

12. A velocity meter according to claim 9, wherein each boundary layer trip comprises a straight wire mounted on the surface of the casing.

13. A velocity meter according to claim 9, wherein each boundary layer trip comprises a roughened area on the surface of the casing.

* * * * *

UNITED STATES PATENT OFFICE
CERTIFICATE OF CORRECTION

Patent No. 3,668,931              Dated  June 13, 1972

Inventor(s)  Klaus Joachim Zanker et al

It is certified that error appears in the above-identified patent and that said Letters Patent are hereby corrected as shown below:

Column 6, line 4 "claim 2" should appear -- claim 1 --.

Signed and sealed this 12th day of December 1972.

(SEAL)
Attest:

EDWARD M. FLETCHER, JR.                ROBERT GOTTSCHALK
Attesting Officer                      Commissioner of Patents